(12) United States Patent
Finn, III

(10) Patent No.: US 6,354,606 B1
(45) Date of Patent: Mar. 12, 2002

(54) CHUCK ADAPTER ASSEMBLY AND RELATED METHOD FOR CONVERTING A FIXED CHUCK TO A COMPENSATING CHUCK

(75) Inventor: Michael J. Finn, III, Cincinnati, OH (US)

(73) Assignee: Xtek, Inc., Cincinnati, OH (US)

( * ) Notice: Subject to any disclaimer, the term of this patent is extended or adjusted under 35 U.S.C. 154(b) by 0 days.

(21) Appl. No.: 09/574,511

(22) Filed: May 19, 2000

(51) Int. Cl.[7] ............................................. B23B 31/16
(52) U.S. Cl. ........................ 279/110; 279/110; 279/123; 279/4.1; 279/132
(58) Field of Search ................................ 279/4.1, 4.12, 279/4.11, 110, 118, 123, 132

(56) References Cited

U.S. PATENT DOCUMENTS

| 3,610,643 A | 10/1971 | Thompson et al. | 279/1 A |
|---|---|---|---|
| 3,751,053 A | 8/1973 | Swanson | 279/119 |
| 3,814,448 A | 6/1974 | Buck | 279/1 J |
| 3,858,893 A | 1/1975 | Ovanin | 279/17 |
| 3,892,419 A | 7/1975 | Jackson et al. | 279/4 |
| 4,116,453 A | 9/1978 | Andre | 279/4 |
| 4,647,051 A | 3/1987 | Stone et al. | 279/1 D |
| 5,429,376 A | 7/1995 | Mueller et al. | 279/4.07 |
| 5,441,284 A | 8/1995 | Mueller et al. | 279/2.02 |
| 5,522,608 A | 6/1996 | Kitson et al. | 279/132 |
| 5,901,967 A | 5/1999 | Morisaki | 279/4.12 |
| 5,941,538 A | 8/1999 | Gonnocci | 279/132 |

Primary Examiner—A. L. Wellington
Assistant Examiner—Terrence Washington
(74) Attorney, Agent, or Firm—Thompson Hine LLP

(57) ABSTRACT

A chuck adapter attachable to a fixed chuck mechanism for converting the fixed chuck mechanism to a compensating chuck mechanism includes an attachment plate for connection to the head of the fixed chuck mechanism. The attachment plate includes a plurality of slots formed therein for alignment with respective drive jaws on the fixed chuck head. A plurality of adapter jaws are provided, each movable along a respective one of the plate slots, each adapter jaw including a movable clamping pin extending therefrom, and each adapter jaw including a hydraulic displacement member which reacts to movement of the clamping pin. A hydraulic circuit is provided in fluid communication with each of the hydraulic displacement members for maintaining substantially the same clamping force on each of the clamping pins as the clamping pins move.

19 Claims, 5 Drawing Sheets

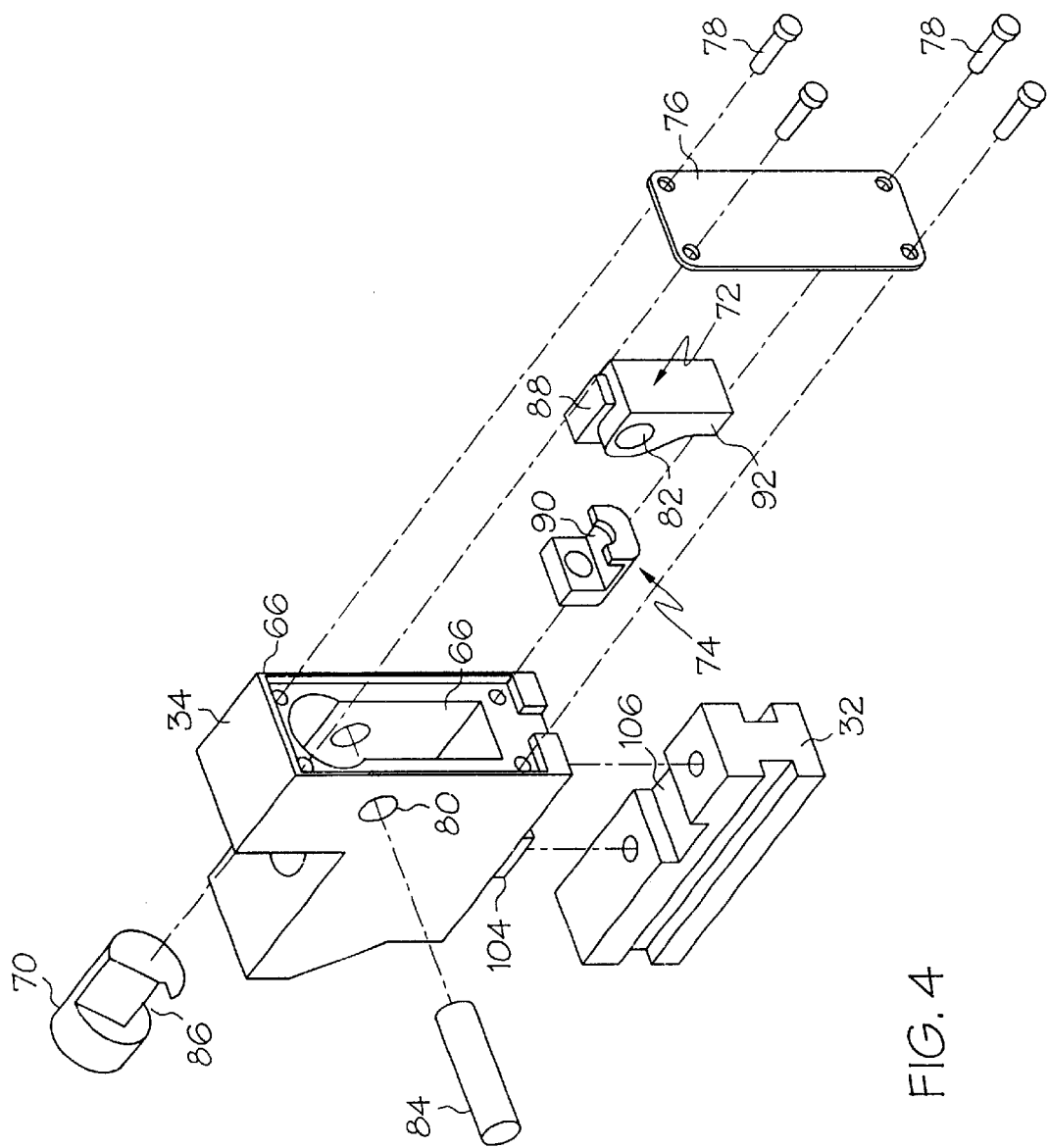

CHUCK ADAPTER ASSEMBLY AND RELATED METHOD FOR CONVERTING A FIXED CHUCK TO A COMPENSATING CHUCK

FIELD OF THE INVENTION

The present invention relates generally to the machining industry and, more particularly, to chucks which are utilized to hold workpieces/stock during the machining process.

BACKGROUND OF THE INVENTION

In the stock material machining industry there are basically two types of chucks which are used to hold the stock material while it is machined. In a fixed chuck, a plurality of jaws (such as three) move simultaneously and radially inward to contact the outer surface of the stock material. The jaws must always move in unison and therefore always move the same amount. Accordingly, if a piece of stock material such as generally cylindrical stock material is not perfectly cylindrical, all three chuck jaws might not contact the outer surface of the stock material, or even if all three jaws do contact the outer surface of the stock material, the stock material may not be centered properly on the central machining axis of the chuck. With such a fixed chuck, it is therefore necessary to first machine one end of the stock material to form a "chucking hub" which is known to be cylindrical about a central axis of the stock material. The jaws of the fixed chuck can then be placed into engagement with the chucking hub of the stock material to hold the stock in a properly aligned manner for rotation and machining.

In a self-adjusting or compensating chuck, the plurality of chuck jaws move radially inwardly in an independent manner so that non-cylindrical or eccentric stock material can be held along its central axis without having to turn a chucking hub. In particular, a center (an indentation) of the stock material is aligned with a mating center (projection) of the self-adjusting chuck and as the jaws move radially inward if one jaw contacts the outer surface of the stock material first, its movement is halted while the other jaws continue to move radially inward until they contact the stock material.

Accordingly, it would be desirable and advantageous to provide a simple mechanism for converting a fixed chuck to a compensating chuck.

SUMMARY OF THE INVENTION

In one aspect of the present invention, a chuck adapter attachable to a fixed chuck mechanism for converting the fixed chuck mechanism to a compensating chuck mechanism includes an attachment plate for connection to the head of the fixed chuck mechanism. The attachment plate includes a plurality of slots formed therein for alignment with respective moveable drive jaws on the fixed chuck head. A plurality of adapter jaws are provided, each movable along a respective one of the plate slots, each adapter jaw including a movable clamping pin extending therefrom, and each adapter jaw including a hydraulic displacement member which reacts to movement of the clamping pin. A hydraulic circuit is provided in fluid communication with each of the hydraulic displacement members. Preferably, the hydraulic circuit maintains substantially the same clamping force on each of the clamping pins as the clamping pins move.

In another aspect of the invention, a chuck mechanism includes a fixed chuck head having a plurality of drive jaws which move in unison with each other. A plurality of movable adapter jaws are provided, each adapter jaw in contact with one of the fixed chuck drive jaws for movement therewith. Each adapter jaw includes a movable clamping pin extending therefrom and a hydraulic displacement member which reacts to movement of the clamping pin. A hydraulic circuit is provided in fluid communication with each of the hydraulic displacement members.

Still a further aspect of the invention provides a method for converting a fixed chuck head to a compensating head including the steps of (a) providing a plurality of adapter jaws, each of which includes a base portion and a clamping pin movable relative thereto, where the movement of the clamping pin causes movement of a hydraulic displacement member; (b) providing a hydraulic circuit between the plurality of adapter jaws for providing a hydraulic clamping force on each of the clamping pins via the hydraulic displacement members; and (c) operatively connecting each of the adapter jaws for movement with a respective movable jaw of the fixed chuck.

BRIEF DESCRIPTION OF THE DRAWINGS

FIG. 4 is an exploded perspective view of one embodiment of an adapter jaw assembly;

DETAILED DESCRIPTION

Figure 1:
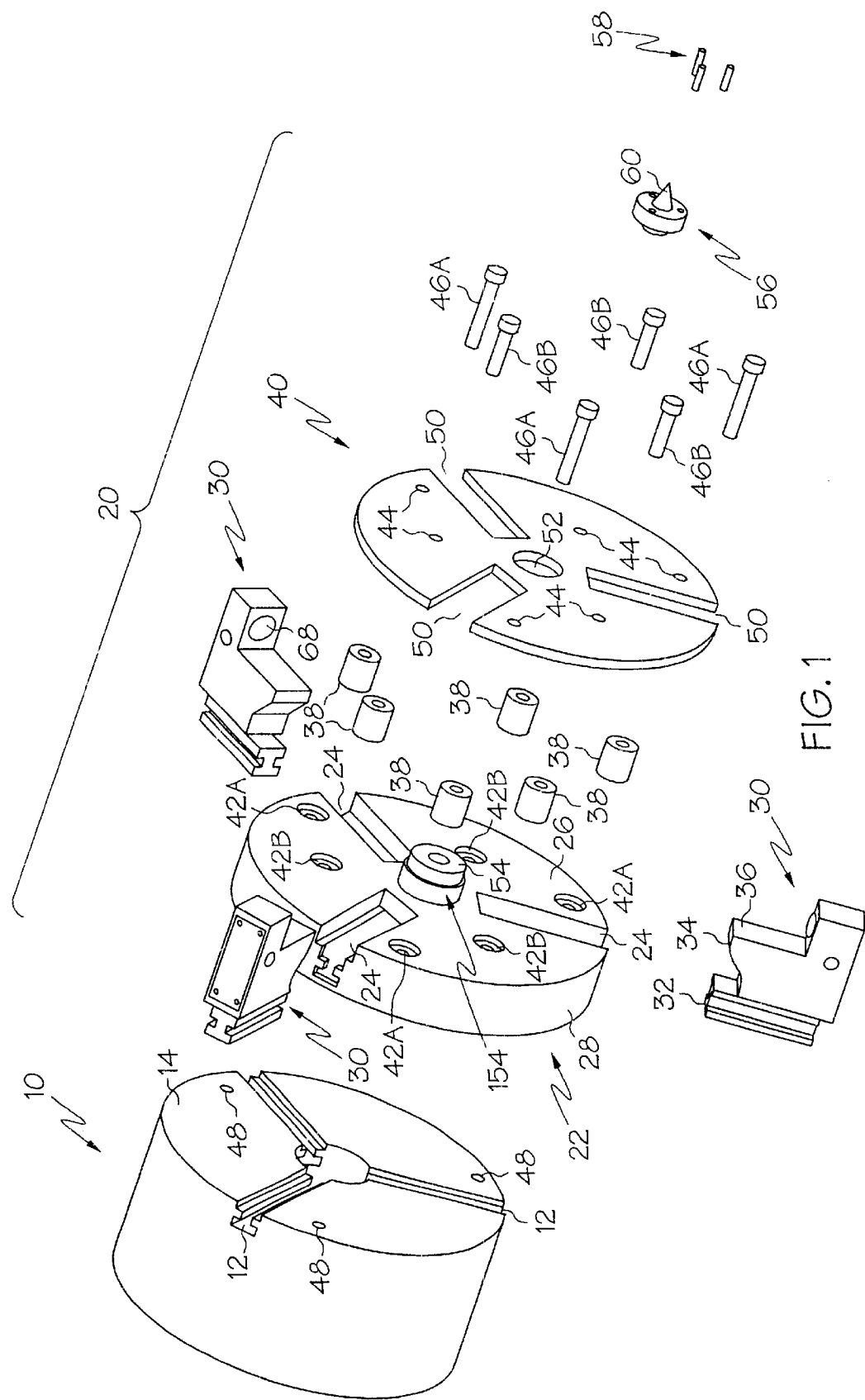
FIG. 1 is an exploded perspective view of a fixed chuck head and one embodiment of an associated chuck adapter assembly.
Figures 5, 6:
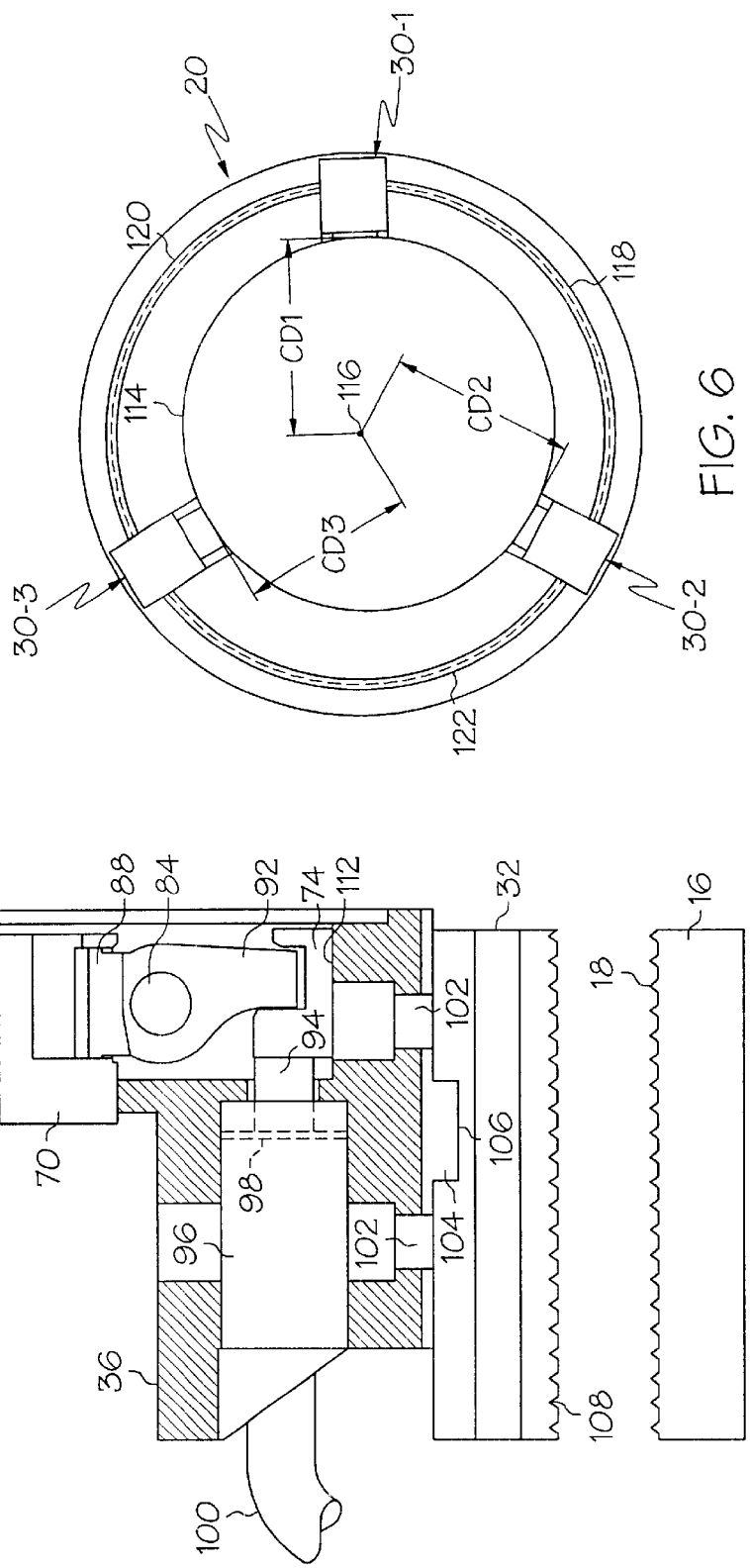
FIG. 5 is a side elevation view in partial cross-section of the adapter jaw assembly of FIG. 4.
FIG. 6 is a top schematic view of the chuck adapter assembly of FIG. 1 holding a workpiece and the fluid communication between the plurality of adapter jaws.

Referring to drawing FIG. 1, a fixed chuck head 10 includes three circumferentially spaced and radially extending slots 12 at an end surface 14 thereof. Each slot 12 carries a respective drive jaw of the fixed chuck head where the drive jaws are movable in unison. For example, the fixed chuck head 10 may be the head of a chuck such as Model No. KNCS 400 available from SMW Systems, Inc. in SantaFe Springs, Calif. The drive jaws 16 (FIG. 5) of the fixed chuck head 10 are recessed within slot 12 and include teeth 18 (FIG. 5). As explained above, the jaws of the fixed chuck head 10 must always move in unison and therefore always move the same amount. Accordingly, if a workpiece such as a piece of stock material is not perfectly cylindrical, all three chuck jaws might not contact the outer surface of the stock material, or even if all three jaws do contact the outer surface of the stock material, the stock material may not be centered properly on the central machining axis of the chuck. Chuck adapter assembly 20 is provided for overcoming this drawback.

In particular, assembly 20 includes an attachment plate 22 which includes a plurality of radially extending slots 24 which are circumferentially spaced for alignment with the slots 12 of the fixed chuck head 10. The attachment plate 22 includes an end wall 26 and a circumferential outer wall 28 which extends from the end wall 26 toward the head 10. An inner diameter defined by the circumferential outer wall 28 is slightly greater than the outer diameter of the fixed chuck head 10 to enable the attachment plate 22 to be positioned over the end of the head 10 such that the outer wall 28 overlaps the end of the fixed chuck head 10. Each of the slots 24 receives a respective adapter jaw assembly 30 which is movable along its slot 24. Each adapter jaw assembly 30 includes a master jaw 32 attached to a slave jaw 34. The slave jaw 34 is substantially L-shaped as shown. The teeth 18 of drive jaw 16 (FIG. 5) mate with teeth 108 (FIG. 5) on master jaw 32 which, in turn, is fastened to the slave jaw 34 of the illustrated assembly 20.

Cylindrical spacers 38 are provided for positioning between attachment plate 22 and an outer plate 40. The spacers align with holes 42 through attachment plate 22 and holes 44 through outer plate 40. Attachment bolts 46A pass through aligned, sets of holes 44, cylindrical spacers 38 and holes 42A and then pass into respective aligned holes 48 in the end surface 14 of the fixed chuck head for securing the chuck adapter assembly 20 to the head 10 as shown in the assembled configuration of FIG. 2. Attachment bolts 46B pass through aligned sets of holes 44, cylindrical spacers 38 and are threaded into holes 42B of the attachment plate 22 for securing outer plate 40 to the attachment plate 22. The spacing between outer plate 40 and attachment plate 22 primarily protects the hydraulic fluid hoses to be described below. Outer plate 40 also includes three radially extending slots 50 positioned for alignment with slots 24 of the attachment plate 22. A central opening 52 through outer plate 40 receives a central hub 54 of the attachment plate 22 and a center 56 is secured to the hub 54 via bolts 58. The center includes a protruding tip 60 for positioning along the central axis of a workpiece.

Figure 2:
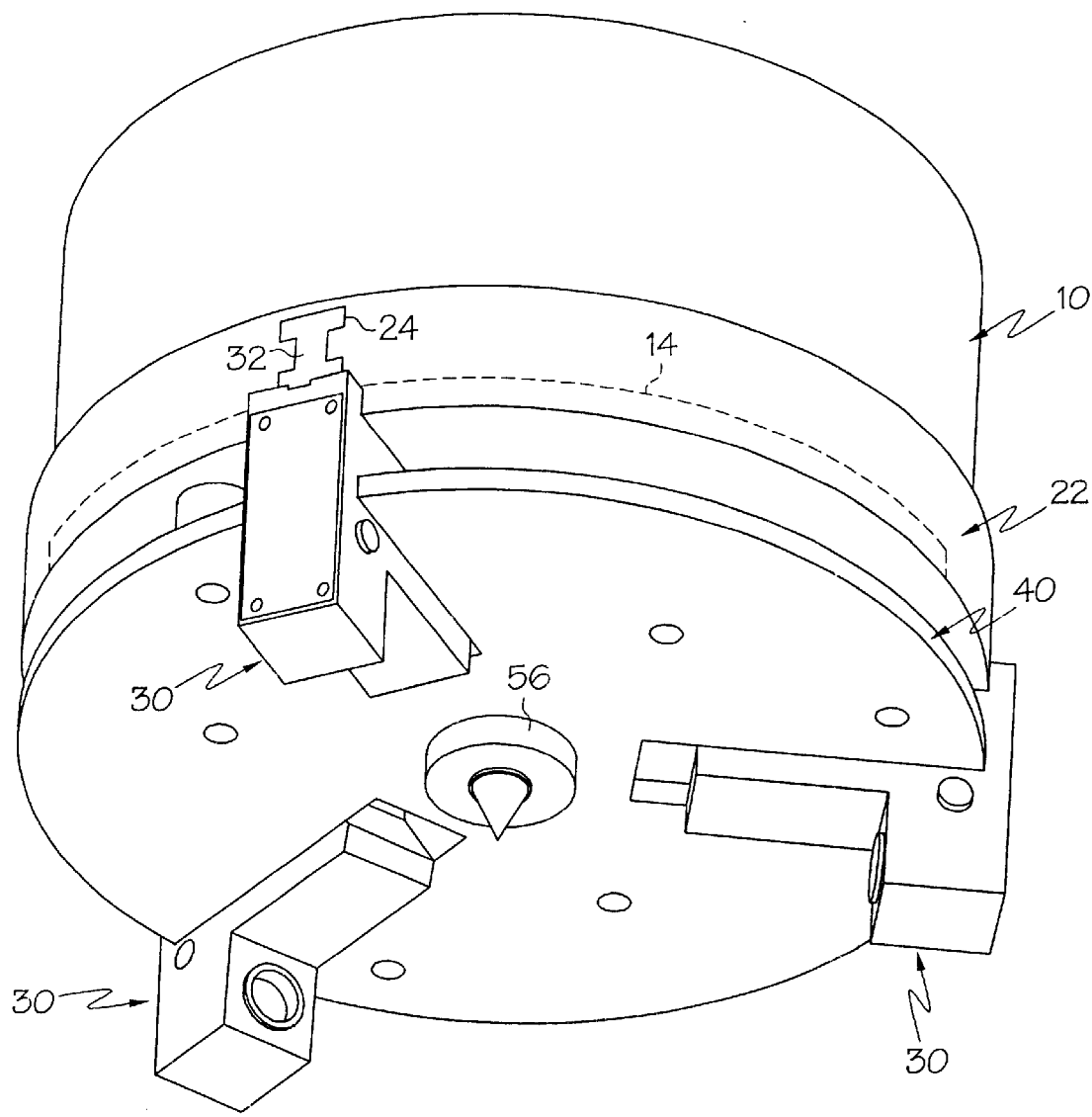
FIG. 2 is an assembled perspective view of the fixed chuck head and adapter chuck assembly of FIG. 1.
Figure 3:
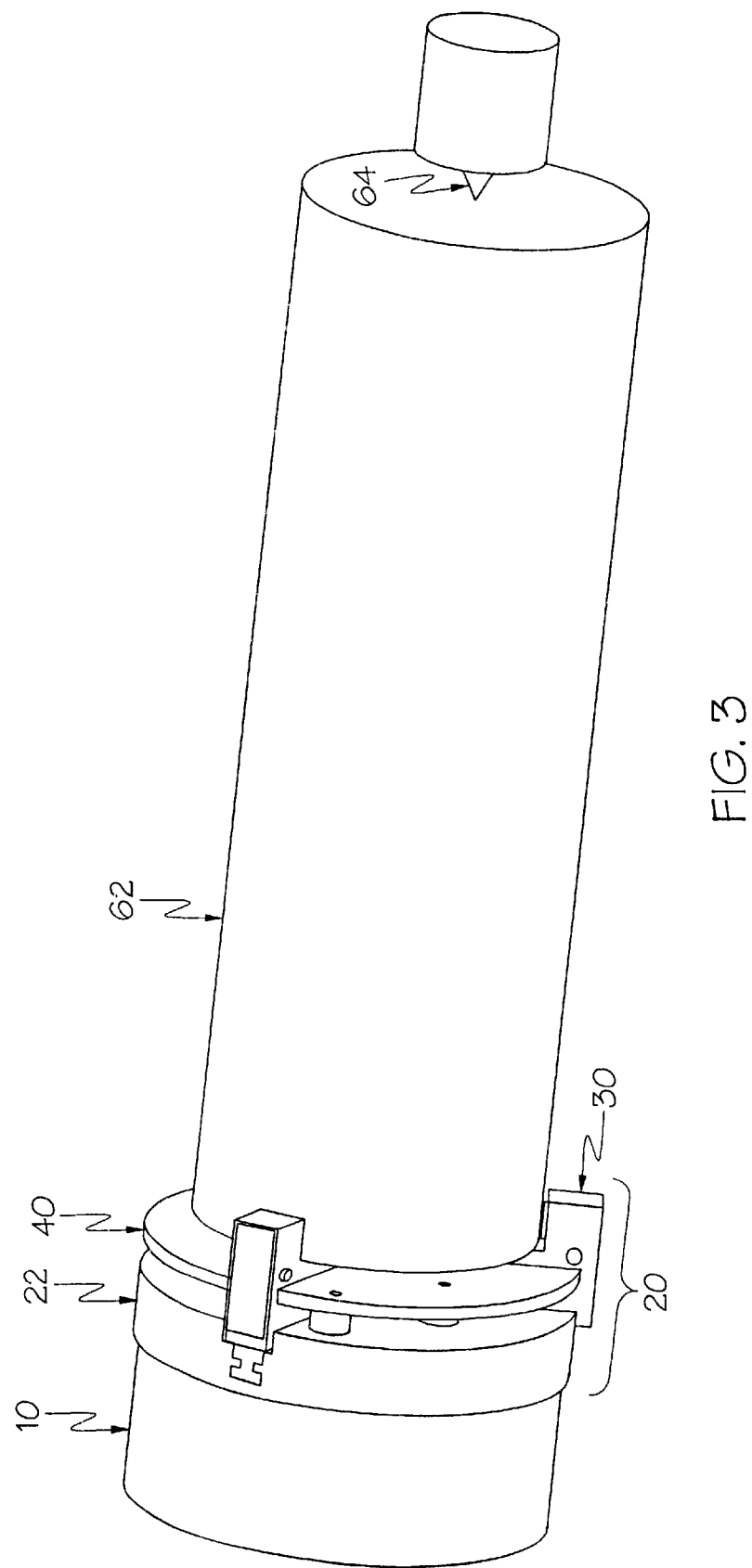
FIG. 3 is a perspective view of the fixed chuck head and adapter assembly of FIG. 1 and a center holding a workpiece.

As best seen in the perspective view of FIG. 2, the master jaw 32 of each assembly 30 is keyed within the slot 24 in the attachment plate 22 and is likewise keyed within the slot 12 of the fixed chuck head for movement therealong. The end surface 14 of the fixed chuck head 10 is shown in shadow. Thus, as the moveable drive jaws of the fixed chuck head 10 move radially inward and outward, the adapter jaw assemblies 30 likewise move radially inward and outward. A held workpiece 62 (FIG. 3) such as the elongated generally cylindrical stock shown in FIG. 3 is positioned with its central axis on the center tip 60 and with the center axis at the opposite end of the piece also positioned on a tailstock center 64. The adapter jaw assemblies 30 engage the outer surface of the workpiece 62 and the workpiece 62 is rotated via rotation of the fixed chuck head 10 and the chuck adapter assembly 20 attached thereto. The attachment plate 22, outer plate 40, spacers 38, master jaws 32, slave jaws 34, center 56 and fasteners are preferably formed of machined, high strength steel to withstand the forces encountered during a workpiece machining operation, but it is recognized that other materials of suitable strength to withstand the forces encountered could be utilized.

Referring now to FIG. 4, an exploded perspective view of an adapter jaw assembly 30 is shown. The slave jaw 34 acts as a housing member and an outer side 66 of the jaw includes an opening 68, as show in FIG. 1, for receiving a clamping pin 70, a pivot arm 72, and a toggle pad 74. An end plate 76 attaches to the slave jaw 34 via bolts 78 for enclosing the interior of the slave jaw. A lateral hole 80 is provided in the slave jaw 34 and a corresponding hole 82 is provided in the pivot arm 72. When the hole 80 and hole 82 are aligned, a pivot pin 84 is inserted through the holes and allows the pivot arm 72 to pivot thereabout. The clamping pin 70 includes an undercut slot 86 which receives an upper end 88 of the pivot arm 72. The toggle pad 74 includes an undercut slot 90 which receives the lower end 92 of the pivot arm 72.

As best seen with reference to the partial cross-section of FIG. 5, an inner side of the toggle pad 74 connects to or abuts against a hydraulic displacement member 94 in the form of a rod which enters a hydraulic cylinder 96 and connects to a piston member 98. The cylinders assemblies are single acting, spring return. The cylinder 96 is in fluid communication with a hydraulic hose 100 or tubing. Each hose 100 extends inward toward the hub 54 and connects to a respective opening on the hub 54 which communicates with a fluid manifold formed therein. Suitable openings positioned on the sides of the slave jaw 32 could also be provided for such hose connections. The adapter jaw assembly and its component parts are again preferably formed of machined, high strength steel to withstand the forces encountered during a workpiece machining operation, but it is recognized that other materials of suitable strength to withstand the forces encountered could be utilized.

The slave jaw 34 may be connected to the master jaw 32 by bolts positioned through openings 102 in the bottom of the slave jaw 34. A notch 104 is also provided in the bottom of the slave jaw 34 for positioning in an undercut 106 of the master jaw 32. The bottom surface of the master jaw includes a plurality of smaller notches 108 for engaging the teeth 18 of the drive jaw 16 of the fixed chuck head. The clamping pin 70 is slidable into and out of an opening 110 in the slave jaw 32 for movement above and along jaw surface 36. As the clamping pin moves, the upper end 88 of the pivot arm 72 moves therewith causing the lower end 92 of the pivot arm 72 to move. Movement of the lower end 92 of the pivot arm 72 causes the toggle pad 74 to move slidingly across a surface 112 which in turn causes corresponding movement of rod 94.

Referring to FIGS. 5 and 6, as each drive jaw 16 of the fixed chuck head moves, its associated jaw assembly 30 moves in unison therewith. A free-flowing, but closed hydraulic circuit is formed by the cylinder 96 in each jaw assembly 30 and by the fluid paths connecting such jaw assemblies, which fluid paths may be formed by suitable hoses 100 in combination with the manifold 154 as described above. Each of the clamping pins 70 is preferably biased slightly radially inward to permit some radially outward movement relative to its assembly 30 when a radially outward force acts on the clamping pin 70. Radially outward movement of a clamping pin 70 of one adapter jaw causes corresponding radially inward movement of its associated cylinder rod 94, causing hydraulic fluid to be displaced out of the cylinder of that one adapter jaw to other parts of the hydraulic circuit, namely through the manifold 154 to the other adapter jaw assemblies.

A non-cylindrical workpiece 114 associated with the chuck adapter assembly is shown in the end view of FIG. 6. The radial or center distance from central axis 116 to point of contact with each adapter jaw assembly 30 is shown, with center distance CD1 being greater than center distance CD2, and center distance CD2 being greater than center distance CD3. Namely, all three (3) center distances are different in magnitude. The hydraulic linkage and hydraulic circuit of the subject assembly compensate for the varying center distances.

In a holding operation, the end of the workpiece is positioned between the center tip 60 and the tailstock center 64 (FIG. 3). The drive jaws 16 of the fixed chuck head are moved radially inward and the adapter jaw assemblies 30-1, 30-2 and 30-3 move radially inward in unison therewith. Relative to FIG. 6, the clamping pin 70 associated with adapter jaw assembly 30-1 contacts the outer surface of workpiece 114 first and causes the pin 70 to stop as the rest of the jaw assembly 30-1 continues to move radially inward. Thus, relative to the rest of jaw assembly 30-1, its clamping pin 70 moves radially outward, causing pivoting movement of its associated pivot arm 72, causing radially inward movement of associated rod 94 relative to the rest of the jaw assembly, thereby displacing hydraulic fluid within the associated cylinder 96 of adapter jaw 30-1 to the cylinders of the other adapter jaws 30-2 and 30-3 along paths 118 and 120. As the fluid is displaced into the cylinders of adjoining assemblies 30-2 and 30-3, it causes the rods associated with such adapter jaws to move radially outward relative to the rest of the assembly, in turn causing pivot of the associated pivot arms and relative radially inward movement of the associated clamping pins. As the adapter jaws 30-1, 30-2 and 30-3 continue to move radially inward, the clamping pin 70 of adapter jaw 30-2 next contacts the outer surface of the workpiece 114 causing hydraulic fluid to be displaced from its cylinder to the cylinder of adapter jaw 30-3 along path 122, until the workpiece 114 is contacted and held by the clamping pins 70 of all the adapter jaws 30-1, 30-2 and 30-3. Movement of the drive jaws 16 of the fixed chuck head is stopped when the holding force applied to the workpiece 114 reaches a predetermined level. Thus, the clamping force is provided by the existing fixed chuck head and the hydraulic linkage/circuit of the chuck adapter distributes the force equally such that the workpiece will not have the tendency to be pushed off of the central axis.

Because the hydraulic circuit in chuck adapter assembly 20 is closed or self-contained and free-flowing, the radially inward pressure applied by each clamping pin 70 is maintained substantially the same, and no hydraulic connection to the fixed chuck head is needed. Thus, by attaching the chuck adapter assembly 20 to the fixed chuck head 10, the fixed chuck head 10 is converted to a compensating chuck mechanism.

Interchangeable clamping pins of different lengths may be provided to facilitate holding of workpieces of different diameters. Thus, when sold as an adapter system or adapter kit, multiple clamping pins of different lengths may be included.

Thus, the apparatus provides a method for converting a fixed chuck mechanism to a compensating chuck mechanism involving the steps of (a) providing a plurality of adapter jaws, each of which includes a base portion and a clamping pin movable relative thereto, where the movement of the clamping pin causes movement of a hydraulic displacement member; (b) providing a hydraulic circuit between the plurality of adapter jaws for providing a hydraulic clamping force on each of the clamping pins via the hydraulic displacement members; and (c) operatively connecting each of the adapter jaws for movement with a respective drive jaw of the fixed chuck. The converted mechanism can then be used to hold a workpiece by (d) moving the drive jaws of the fixed chuck in unison thereby causing the adapter jaws to move toward a workpiece; (e) contacting a portion of the workpiece with a first of the clamping pins causing the first clamping pin to stop as its base portion continues to move; (f) responsive to step (e), moving the hydraulic displacement member associated with the first clamping pin; (g) responsive to step (f), moving the hydraulic displacement member associated with a second of the clamping pins; and (h) responsive to step (h), moving the second clamping pin relative to its base portion and towards the workpiece.

Although the invention has been described and illustrated in detail it is to be clearly understood that the same is intended by way of illustration and example only and is not intended to be taken by way of limitation. For example, while a preferred structure is described for connecting adapter jaw assemblies to a fixed chuck head, it is recognized that other variations are possible, particularly where the fixed chuck head varies in configuration. Further, while in the illustrated embodiment the clamping pin of each adapter jaw assembly moves a pivot arm which in turn moves a toggle pad associated with a rod which extends into a cylinder, it is recognized that such structure could be eliminated in its entirety where the inner end of the clamping pin is in fluid communication with the hydraulic circuit and causes direct displacement of hydraulic fluid in contact therewith, and that in such cases the inner end of each clamping pin would constitute a hydraulic displacement member. Still further, while in the illustrated embodiment the adapter jaw assembly includes a separate master jaw connected to a slave jaw, it is recognized that the master jaw and slave jaw could be formed as a unitary jaw member. Accordingly, the spirit and scope of the invention are to be limited only by the terms of the appended claims.

What is claimed is:

1. A chuck adapter attachable to a fixed chuck mechanism for converting the fixed chuck mechanism to a compensating chuck mechanism, comprising:

an attachment plate for connection to the fixed chuck mechanism, the attachment plate including a plurality of slots formed therein for alignment with respective drive jaws on the fixed chuck mechanism;

a plurality of adapter jaws each of which is movable along a respective one of the plate slots, each adapter jaw including a movable clamping pin extending therefrom, each adapter jaw including a hydraulic displacement member which reacts to movement of the clamping pin; and a self-contained hydraulic circuit in fluid communication with each of the hydraulic displacement members.

2. The chuck adapter of claim 1 wherein the hydraulic circuit maintains substantially the same clamping force on each of the clamping pins as the clamping pins move relative to their adapter jaws.

3. The chuck adapter of claim 1 wherein a first side of each clamping pin contacts a first side of a pivotable arm, and a second side of the pivotable arm contacts a sliding toggle pad which connects to the hydraulic displacement member.

4. The chuck adapter of claim 3 wherein the hydraulic displacement member comprises a rod which extends into a hydraulic cylinder which forms part of the hydraulic circuit.

5. The chuck adapter of claim 4 wherein the pivotable arm, toggle pad, rod and hydraulic cylinder of each adapter jaw is positioned within a jaw housing.

6. The chuck adapter of claim 1 wherein the plurality of slots comprise at least three radially extending slots which are equally spaced circumferentially about the plate and wherein the plurality of adapter jaws comprise at least three adapter jaws.

7. The chuck adapter of claim 1 wherein each adapter jaw includes a portion for engaging the drive jaw of the fixed chuck mechanism.

8. The chuck adapter of claim 7 wherein each clamping pin moves along a path parallel to the adapter jaw path for contacting an outer surface of a workpiece.

9. The chuck adapter of claim 1 wherein the attachment plate includes a plurality of holes for receiving fasteners for connecting the adapter to the fixed chuck mechanism.

10. The chuck adapter of claim 9, further comprising:

a second plate spaced from the attachment plate by a plurality of spacers, the second plate including a corresponding plurality of slots for alignment with the plurality of slots on the attachment plate, the second plate including a plurality of holes; and wherein a portion of each adapter jaw, including the clamping pin thereof, extends from the second plate slot.

11. The chuck adapter of claim 1 wherein each clamping pin extends from a pin receiving opening.

12. A chuck mechanism, comprising:

a fixed chuck head including a plurality of drive jaws which move in unison with each other;

a plurality of movable adapter jaws, each adapter jaw in contact with one of the fixed chuck head drive jaws for movement therewith, each adapter jaw including a movable clamping pin extending therefrom and a hydraulic displacement member which reacts to movement of the clamping pin; and a hydraulic circuit in fluid communication with each of the hydraulic displacement members.

13. The chuck mechanism of claim 12 wherein the hydraulic circuit maintains substantially the same clamping force on each of the clamping pins as the clamping pins move relative to their adapter jaws.

14. The chuck mechanism of claim 12 wherein, in each adapter jaw, a first side of each clamping pin contacts a first side of a pivotable arm, and a second side of the pivotable arm contacts a sliding toggle pad which contacts the hydraulic displacement member.

15. The chuck mechanism of claim 14 wherein each clamping pin moves along a path parallel to the adapter jaw path and contacts an outer surface of a workpiece.

16. The chuck mechanism of claim 14, further comprising:

an attachment plate connected to the fixed chuck head and having a plurality of radially extending slots formed therein each of which aligns with one of the drive jaws of the fixed chuck head, the attachment plate including a plurality of holes therethrough;

wherein each adapter jaw includes a first portion keyed within one of the radially extending slots of the attachment plate for movement therealong, and a second portion which extends away from the fixed chuck head;

a second plate spaced from the attachment plate by a plurality of spacers, the second plate including a corresponding plurality of slots for alignment with the plurality of slots on the attachment plate, the second plate including a plurality of holes;

wherein the fixed chuck head includes a plurality of holes which align with the holes of the attachment plate and the second plate;

a plurality of fasteners each of which passes through one of the second plate holes, one of the spacers, one of the attachment plate holes and one of the fixed chuck head holes; and wherein the clamping pin of each adapter jaw is spaced from an outer side of the second plate.

17. A chuck adapter assembly, comprising:

a plurality of movable adapter jaws, each adapter jaw including a movable clamping pin extending therefrom, each adapter jaw including a hydraulic displacement member which reacts to movement of the clamping pin;

a self-contained hydraulic circuit in fluid communication with each of the hydraulic displacement members; and wherein movement of the hydraulic displacement member of a first of the adapter jaws causes displacement of hydraulic fluid to at least one other adapter jaw resulting in movement of the clamping pin of the one other adapter jaw.

18. A method for converting a fixed chuck head to a compensating head, the method comprising the steps of:

(a) providing a plurality of adapter jaws, each of which includes a base portion and a clamping pin movable relative thereto, where the movement of the clamping pin causes movement of a hydraulic displacement member within the base portion;

(b) providing a hydraulic circuit between the plurality of adapter jaws for providing a hydraulic clamping force on each of the clamping pins via the hydraulic displacement members; and (c) operatively connecting each of the adapter jaws for movement with a respective drive jaw of the fixed chuck.

19. The method of claim 18, comprising the further steps of:

(d) moving the drive jaws of the fixed chuck in unison thereby causing the adapter jaws to move toward a workpiece;

(e) contacting a portion of the workpiece with a first of the clamping pins causing the first clamping pin to stop as its base portion continues to move;

(f) responsive to step (e), moving, relative to its respective base portion, the hydraulic displacement member associated with the first clamping pin;

(g) responsive to step (f), moving, relative to its respective base portion, the hydraulic displacement member associated with a second of the clamping pins; and (h) responsive to step (h), moving, relative to its respective base portion, the second clamping pin relative to its base portion and towards the workpiece.

* * * * *